US008628061B2

(12) United States Patent
Bibbee

(10) Patent No.: US 8,628,061 B2
(45) Date of Patent: Jan. 14, 2014

(54) MOTORCYCLE LEAN ANGLE JACK

(76) Inventor: E. Bruce Bibbee, Fostoria, OH (US)

( * ) Notice: Subject to any disclaimer, the term of this patent is extended or adjusted under 35 U.S.C. 154(b) by 370 days.

(21) Appl. No.: 12/797,932

(22) Filed: Jun. 10, 2010

(65) Prior Publication Data

US 2010/0320429 A1 Dec. 23, 2010

Related U.S. Application Data

(60) Provisional application No. 61/218,128, filed on Jun. 18, 2009.

(51) Int. Cl.

*B60P 1/14* (2006.01)
*B66F 3/12* (2006.01)
*B66F 3/36* (2006.01)
*B66F 3/22* (2006.01)
*B66F 3/00* (2006.01)

(52) U.S. Cl.

USPC ........... 254/100; 254/126; 254/122; 254/124; 254/7 R; 254/4 R

(58) Field of Classification Search

USPC ........................ 254/100, 103, 134, 133 R, 98
See application file for complete search history.

(56) References Cited

U.S. PATENT DOCUMENTS

| | | | | |
|---|---|---|---|---|
| 3,948,106 | A * | 4/1976 | Armbruster | 254/1 |
| 4,377,295 | A | 3/1983 | Lemman | |
| 4,637,624 | A | 1/1987 | Shur | |
| 5,460,352 | A * | 10/1995 | Calafi | 254/126 |
| 5,967,732 | A | 10/1999 | Floyd | |
| 5,984,337 | A | 11/1999 | Dubin | |
| 6,945,549 | B1 | 9/2005 | Hare | |
| 7,007,964 | B2 | 3/2006 | Lewoczko | |
| 2008/0315541 | A1 * | 12/2008 | Konopa | 280/47.131 |
| 2009/0057635 | A1 * | 3/2009 | Klco | 254/7 R |

* cited by examiner

*Primary Examiner* — Monica Carter
*Assistant Examiner* — Seahee Yoon
(74) *Attorney, Agent, or Firm* — Fraser Clemens Martin & Miller LLC; William J. Clemens

(57) ABSTRACT

A jack assembly including a base for contacting a support surface and a shaft having a first end coupled to the base and a second end, wherein the shaft includes a power screw disposed therein; and a coupling head pivotally coupled to the second end of the shaft, wherein the coupling head is adapted to be coupled to an object to be lifted.

16 Claims, 3 Drawing Sheets

MOTORCYCLE LEAN ANGLE JACK

CROSS-REFERENCE TO RELATED APPLICATIONS

The present application claims priority to U.S. Provisional Application Ser. No. 61/218,128 filed Jun. 18, 2009, hereby incorporated herein by reference in its entirety.

FIELD OF THE INVENTION

The invention is related to a motorcycle jack. More particularly, the invention is directed to a lean angle jack.

BACKGROUND OF THE INVENTION

In many repairs of a motorcycle it is desirable, if not necessary, to gain access to a lower portion of the motorcycle to facilitate repair thereof. One solution requires the entire motorcycle to be lifted off the ground. One problem with a full lift is preventing the motorcycle wheels from moving during the repair operation on the motorcycle. Another issue with conventional jacks has been the slippage of the jack assembly during the repair operation. Either of these problems can cause the entire motorcycle to fall from the jack assembly, thereby damaging the motorcycle.

Additionally, bikers tend to travel long distances cross-country and on back trails with large and heavy motorcycles where the convenience of service and repair is not readily available should service be required or the motorcycle is laid on its side.

It would be desirable to have a compact and travel-ready jack system, wherein the system provides a safe and reliable means to lean a motorcycle at an angle for repairs and lift a motorcycle from a fallen position.

SUMMARY OF THE INVENTION

Concordant and consistent with the present invention, a compact and travel-ready jack system, wherein the system provides a safe and reliable means to lean a motorcycle at an angle for repairs and lift a motorcycle from a fallen position, has surprisingly been discovered.

In one embodiment, a jack assembly comprises: a base for contacting a support surface; and a shaft having a first end coupled to the base and a second end, wherein the shaft includes a power screw disposed therein; and a coupling head pivotally coupled to the second end of the shaft, wherein the coupling head is adapted to be coupled to an object to be lifted.

In another embodiment, a jack system for a motorcycle comprises: a mounting hardware coupled to the motorcycle; and a jack assembly including a base for contacting the ground, a shaft coupled to the base, wherein the shaft includes a hollow housing with a power screw disposed therein, and a coupling head pivotally coupled to the hollow housing of the shaft, wherein the coupling head is releaseably coupled to the mounting hardware.

In yet another embodiment, a jack system for a motorcycle comprises: a mounting hardware coupled to a frame of the motorcycle; a jack assembly including a base for contacting the ground, a shaft pivotally and releaseably coupled to the base, wherein the shaft includes a hollow housing with a power screw disposed therein, and a coupling head pivotally coupled to the hollow housing of the shaft, wherein the coupling head is releaseably coupled to the mounting hardware; and a tie down coupled between the base and the frame of the motorcycle.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
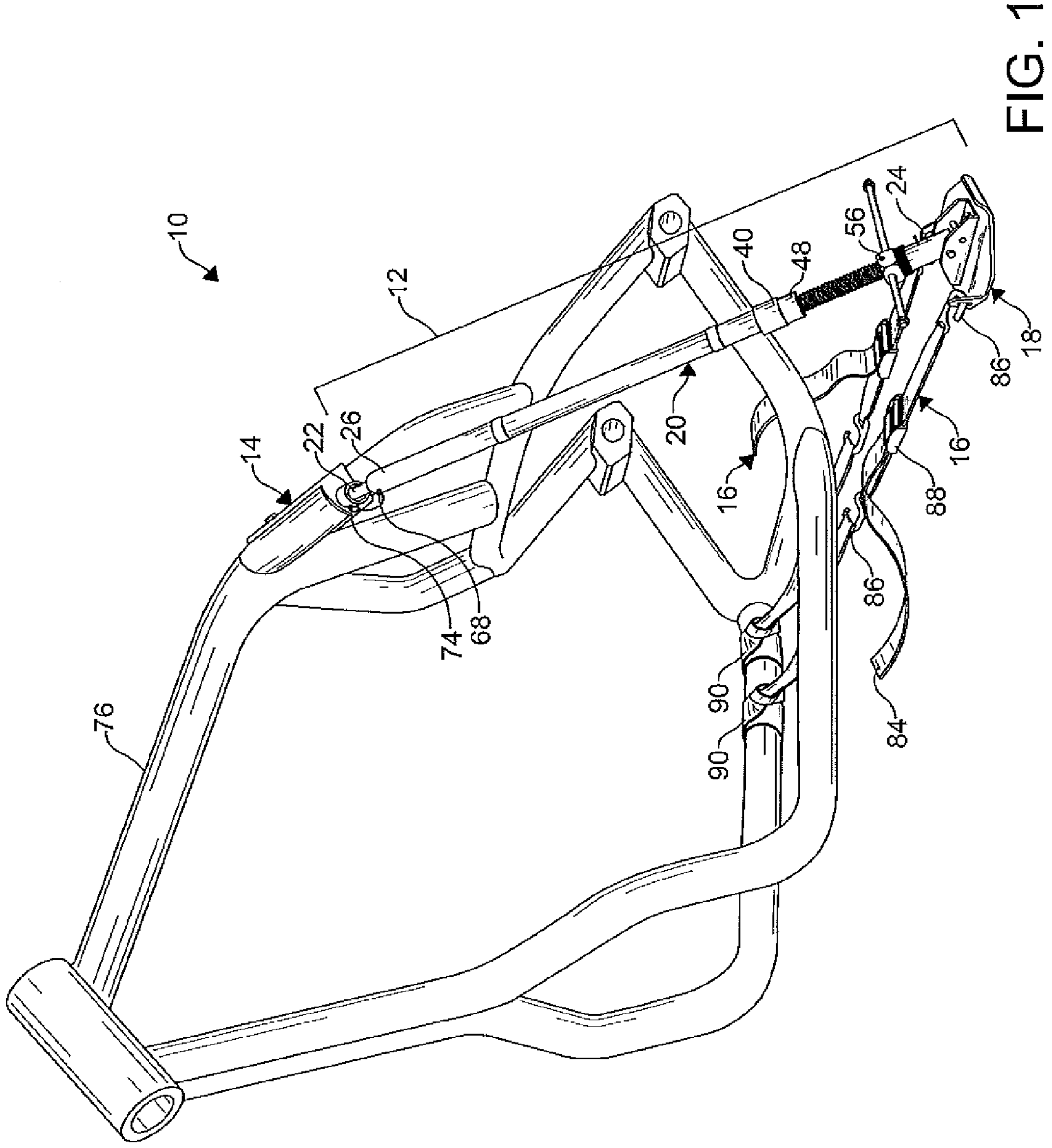
FIG. 1 is a perspective view of a jack system coupled to a frame of a motorcycle according to an embodiment of the present invention.
Figure 2:
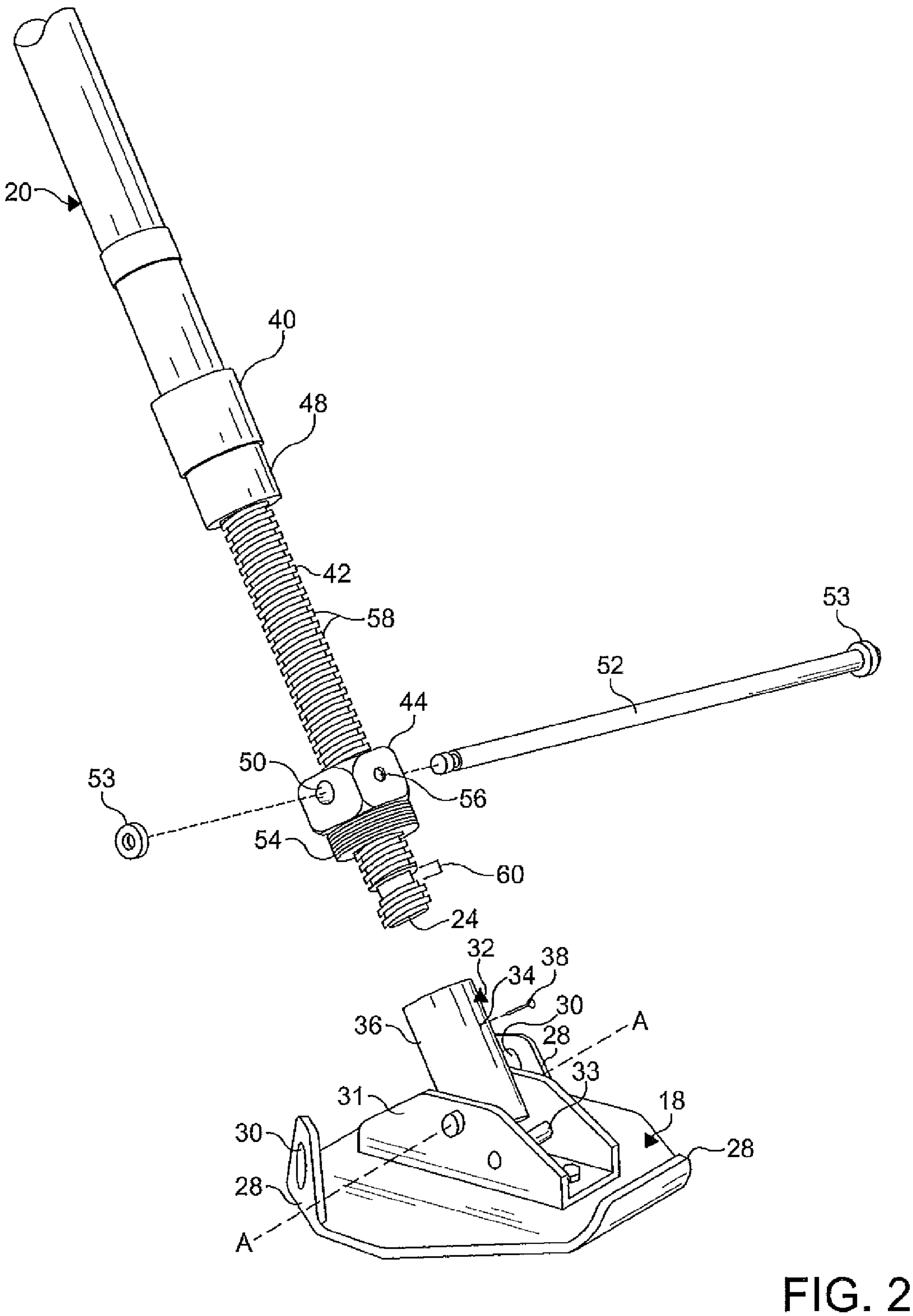
FIG. 2 is an enlarged fragmentary partially exploded perspective view of the jack system of FIG. 1, showing a lower portion of the jack system.

The following detailed description and appended drawings describe and illustrate various embodiments of the invention. The description and drawings serve to enable one skilled in the art to make and use the invention, and are not intended to limit the scope of the invention in any manner.

Referring to the drawings, there is illustrated a jack system 10 for motorcycles. Although the jack system 10 may be used with other vehicles and objects, favorable results have been achieved with a touring family of motorcycles. As shown, the jack system 10 includes a jack assembly 12, a mounting hardware 14, and a tie down 16. Each of the components of the jack system 10 may be stored in a single storage bag along with an instruction manual and any tools required for assembling the jack system 10.

The jack assembly 12 includes a base 18, a shaft 20, and a coupling head 22. The base 18 is coupled to a first end 24 of the shaft 20 and the coupling head 22 is disposed at a second end 26 of the shaft 20. In the embodiment shown, the base 18 has a substantially planar surface for contact with the ground and the shaft 20 is substantially elongate. However, it is understood that the base 18 and the shaft 20 may have any size and shape.

In the embodiment shown, the base 18 includes a plurality of flanges 28. At least one of the flanges 28 has an aperture 30 formed therein. The base 18 further includes a mounting element 31 coupled thereto. A receiving component 32 is pivotally coupled to the mounting element 31, and is thereby secured to the base 18, while having a freedom to pivot about an axis A-A. In certain embodiments, a restraining member 33 is disposed adjacent the receiving component 32 to limit a range of rotational motion thereof. As a non-limiting example, the restraining member 33 is a metallic pin coupled to the mounting element 31 and disposed parallel to the axis A-A. It is understood that the mounting element 31 and the receiving component 32 can have any shape and size. It is further understood that any means of pivotally coupling the receiving component 32 to the base 18 can be used or that any retaining device can be used.

The receiving component 32 is releaseably coupled to the shaft 20 for securing the shaft 20 to the base 18. As shown, the receiving component 32 has a hollow cylindrical shape with an aperture 34 formed in a side wall 36 thereof. The aperture 34 is adapted to receive a retaining device 38 such as a screw, for example. Although one aperture is shown, it is understood that any number of apertures may be used.

The shaft 20 includes a hollow housing 40 with a power screw 42 disposed therein. As a non-limiting example, a rubber stopper 43 is disposed in the hollow housing 40 adjacent the second end 26 of the shaft 20. It is understood that any number of rubber stoppers may be used to seal the hollow housing 40. The power screw 42 includes a torque nut 44 disposed thereon, adjacent the first end 24 of the shaft 20. A nut drive 48 is disposed between the hollow housing 40 and the torque nut 44. Specifically, the nut drive 48 is coupled to the hollow housing 40 and adapted to engage the power screw 42. As a non-limiting example the nut drive 48 is formed from a plastic material. However, other materials may be used.

As shown, the torque nut 44 includes a lever through-hole 50 for receiving a lever rod 52. As a non-limiting example, a thrust bearing 54 is disposed adjacent the torque nut 44 for supporting an axial load while permitting rotational motion of the power screw 42. As a further example, the torque nut 44 may be coupled to the power screw 42 using a locking screw 56. However other retaining and locking devices may be used. As shown, the power screw 42 includes a helical thread 58 and a retaining feature 60 for coupling the power screw 42 to the receiving component 32 of the base 18. As a non-limiting example, the retaining feature 60 of the power screw 42 is an annular channel formed in the power screw 42, wherein the channel receives a portion of the retaining device 38 to militate against axial movement of the power screw 42 relative to the base 18.

Figure 3:
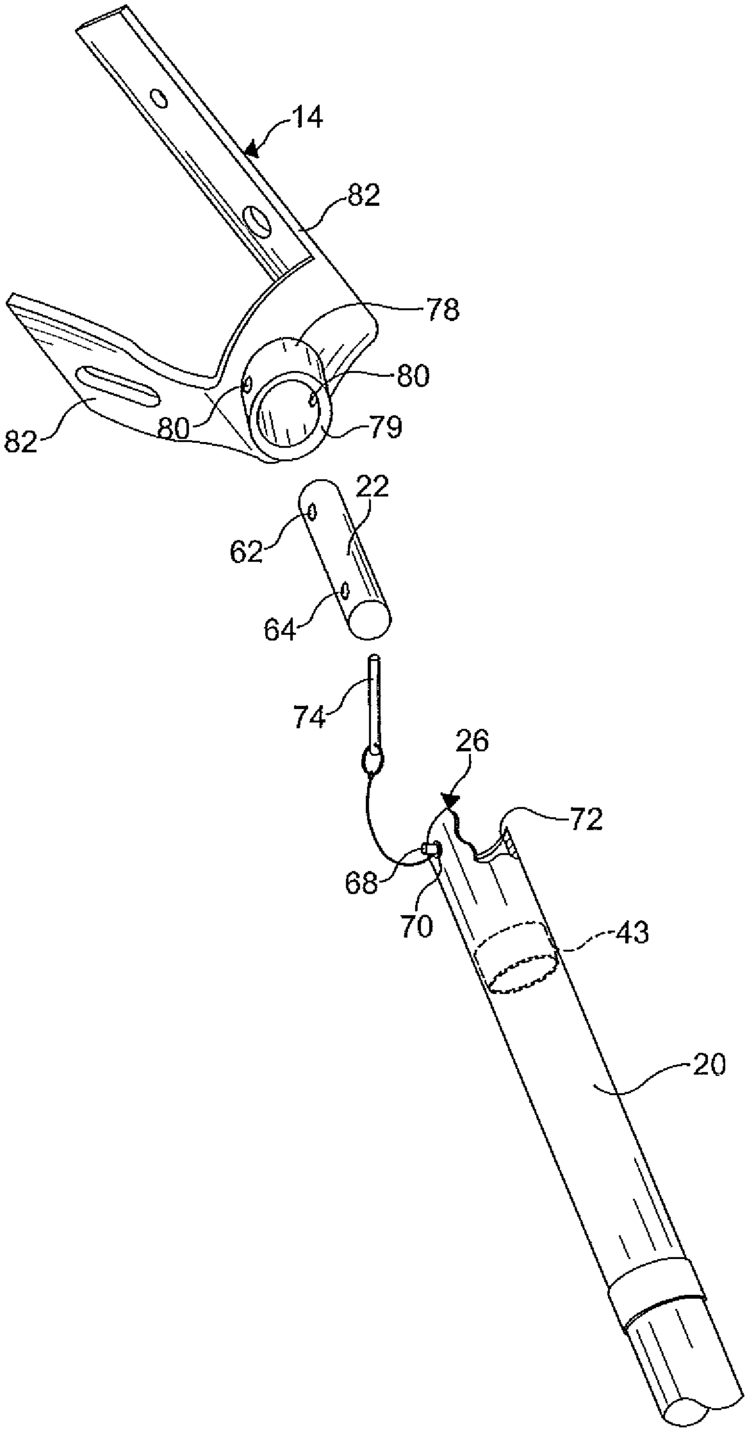
FIG. 3 is an enlarged fragmentary partially exploded perspective view of the jack system of FIG. 1, showing an upper portion of the jack system.

As more clearly shown in FIG. 3, the coupling head 22 of the jack assembly 12 is formed to be received by the mounting hardware 14, thereby securely coupling the motorcycle to the jack assembly 12. As shown, the coupling head 22 has an elongate cylindrical shape with a plurality of through-holes 62, 64 formed adjacent opposite ends thereof. As such, the coupling head 22 is pivotally coupled to the hollow housing 40 by a first locking pin 68 extending through an aperture 70 formed in the housing 40 and the through-hole 64 formed in the coupling head 22. As a non-limiting example, the second end 26 of the shaft 20 has a chamfered edge 72 to provide additional range of motion for the coupling head 22. Similarly, the coupling head 22 is pivotally coupled to the mounting hardware 14 by a second locking pin 74 extending through another of the through-holes 62 formed in the coupling head 22. It is understood that the coupling head 22 is able to freely rotate about each of the locking pins 68, 74. It is further understood that a diameter of the through-holes 62, 64 along with the chamfered edge 72 provide additional freedom of motion for the coupling head 22 relative to the hollow housing 40. In certain embodiments, each of the locking pins 68, 74 is securely attached to the shaft 20 by a retaining device such as a wire, for example.

The mounting hardware 14 is formed to receive the coupling head 22, and thereby releasably couple the jack assembly 12 to a frame 76 of the motorcycle. In the embodiment shown, the mounting hardware 14 includes a jack adapter 78 for receiving the coupling head 22 of the jack assembly 12. The jack adapter 78 has a substantially tubular shape and includes a chamfered edge 79 to provide additional range of motion for the coupling head 22. A pair of through-holes 80 are formed in a wall of the jack adapter 78 to receive the locking pin 74 to secure the coupling head 22 to the mounting hardware 14. It is understood that the structure of the mounting hardware 14 surrounding and supporting the adapter 78 may have a pre-defined shape that is particular to the motorcycle or object to be lifted. As a non-limiting example, the mounting hardware 14 includes a plurality of arms 82 for coupling the adapter 78 to the frame 76 of the motorcycle. It is further understood that the mounting hardware 14, including the adapter 78, may be manufactured as part of the frame 76 of the motorcycle. The mounting hardware 14 may also be installed on the frame 76 during a post-manufacturing process.

The tie down 16 may include a strap 84 having a safety hook 86 disposed on each end thereof, and a cam buckle 88 disposed intermediate the safety hooks 86. However, it is understood that the tie down 16 may be formed from any flexible materials such as nylon and polyester and may have any size. It is further understood that other devices may be used in cooperation with the tie down 16 such as ratchet devices for adjusting tension in the strap 84.

In use, the coupling head 22 is attached to the shaft 20. The tie down 16 is coupled to a portion of the frame 76 of the motorcycle. As a non-limiting example, one of the safety hooks 86 of the tie down 16 is coupled to one of the flanges 28 of the base 18 and the tie down 16 is looped over a lower rail of the frame 76. Another one of the safety hooks 86 of the tie down 16 is coupled to another one of the flanges 28 of the base 18. It is understood that a soft-tie 90 may be looped around the lower rail of the frame 76 and the tie down 16 coupled between one of the flanges 28 of the base 18 and the soft-tie 90. Hooks can also be used to couple the tie down 16 to the frame 76. It is further understood that the tie down 16 may be directly coupled to a portion of the motorcycle. However, favorable results have been achieved by coupling the tie down 16 to one of the flanges 28 of the base 18 and a portion of the motorcycle located below the mounting hardware 14.

Once the tie down 16 is wrapped around a portion of the frame 76 of the motorcycle and the safety hooks 86 of the tie down 16 are coupled to the base 18 of the jack assembly 12, the coupling head 22 is inserted into the jack adapter 78 and coupled thereto. The base 18 of the jack assembly 12 is placed firmly on the ground and the second locking pin 74 secures the coupling head 22 within the jack adapter 78. It is understood that the coupling head 22 can be secured to the mounting hardware 14 prior to securing the tie downs to the base 18.

While the coupling head 22 is secured within the jack adapter 78, the lever rod 52 is inserted in the lever through-hole 50 of the torque nut 44. The lever arm 52 is used to rotate the torque nut 44 and thereby rotate the power screw 42. As the torque nut 44 rotates, the power screw 42 is caused to rotate within the hollow housing 40, thereby lengthen or shorten an overall length of the shaft 20. Specifically, the helical threads 58 of the power screw 42 engage the nut drive 48 to form a “pushing force” for lifting the motorcycle from a horizontal plane to a vertical plane or adjusting a lean angle thereof. It is understood that the cam buckles 88 may be adjusted to remove any slack in the strap 84 of the tie down 16, thereby minimizing slippage of the motorcycle along the ground while the motorcycle is being lifted. It is further understood that by coupling the safety hooks 86 to a portion of the frame 76 of the motorcycle that is below the mounting hardware 14, a “pulling force” of the tie down 16 will cooperate with the “pushing force” of the power screw 42 to create a pivot point for lifting the motorcycle or adjusting a lean angle thereof. The lean angle of the motorcycle is determined by the overall length of the shaft 20 and the distance between the base 18 and the motorcycle. The motorcycle frame 76 is shown in FIG. 1 oriented in a vertical plane with the tie down 16 coupled to a bottom portion of the frame below the mounting hardware 14 that is coupled to a middle portion of the frame.

Accordingly, the jack system 10 provides a compact, travel-ready, and reliable means to adjust a lean angle of a motorcycle for repairs. Additionally, the jack system 10 provides a means for a single operator to lift a fallen motorcycle.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A jack system for lifting a fallen motorcycle and for adjusting a lean angle of the motorcycle between fallen and upright positions of the motorcycle, the motorcycle having a frame with a bottom portion, a middle portion, a first side and a second side, comprising:

a base having a planar surface configured for contacting a support surface upon which the first side of the motorcycle is resting in the fallen position;

a shaft having a first end and a second end, the shaft including a power screw disposed therein, the power screw being pivotally coupled to the base at the first end of the shaft;

a coupling head pivotally coupled to the second end of the shaft;

a mounting hardware forming a portion of or installed on the middle portion of the frame at the first side, the mounting hardware releasably receiving the coupling head; and a tie down coupled to the base and adapted to be coupled to the bottom portion of the frame at the second side wherein when the base is spaced from the bottom portion of the frame on the support surface, the coupling head is received by the mounting hardware, and the tie down is coupled to the bottom portion of the frame at the second side, rotation of the power screw cooperates with the tie down to move the motorcycle between the fallen position and the upright position relative to the support surface.

2. The jack system according to claim 1 wherein the base includes a flange disposed adjacent an edge thereof.

3. The jack system according to claim 1 further comprising a nut drive engaging the power screw to control an axial extension of the shaft in response to a rotation of the power screw.

4. The jack system according to claim 1 further comprising a torque nut coupled to the power screw to provide a means of rotating the power screw to control an axial extension of the shaft in response to a rotation of the power screw.

5. The jack system according to claim 4 wherein the torque nut includes a throughhole to receive a lever rod therethrough to provide a means of rotating the power screw.

6. The jack system according to claim 1 wherein the second end of the shaft has a chamfered edge to maximize a range of motion of the coupling head.

7. The jack system according to claim 1 wherein the shaft includes a hollow housing with the power screw disposed therein.

8. The jack system according to claim 7 further comprising a nut drive coupled to the hollow housing and engaging the power screw to control an axial movement of the housing relative to the power screw in response to a rotation of the power screw.

9. The jack system according to claim 1 wherein the base includes an aperture formed therein to receive at least a portion of the tie down therethrough.

10. The jack system according to claim 1 wherein the shaft is pivotally coupled to the base with a receiving member.

11. The jack system according to claim 10 further comprising a restraining member coupled to the base and disposed adjacent at least one of the shaft and the receiving member to limit a pivotal motion of the shaft.

12. The jack system according to claim 1 further comprising a torque nut coupled to the power screw for rotating the power screw.

13. The jack system according to claim 1 wherein the torque nut includes a throughhole to receive a lever rod therethrough for rotating the power screw.

14. The jack system according to claim 1 wherein the mounting hardware includes a jack adapter for receiving the coupling head to secure the jack assembly to the motorcycle frame, the jack adapter including a chamfered edge to maximize a range of motion of the coupling head coupled thereto.

15. The jack system according to claim 1 wherein the tie down includes a cam buckle for adjusting a tension therein.

16. A jack system for lifting a fallen motorcycle and for adjusting a lean angle of the motorcycle between fallen and upright positions of the motorcycle, the motorcycle having a frame with a bottom portion, a middle portion, a first side and a second side, comprising:

a base having a planar surface configured for contacting a support surface upon which the first side of the motorcycle is resting in the fallen position, the base including a flange disposed adjacent an edge thereof;

a shaft having a first end and a second end, the shaft including a hollow housing with a power screw disposed therein pivotally coupled to the base;

a nut drive engaging the power screw to control an axial extension of the shaft in response to a rotation of the power screw;

a torque nut coupled to the power screw for rotating the power screw to control an axial extension of the shaft in response to a rotation of the power screw, the torque nut including a throughhole to receive a lever rod therethrough for rotating the power screw;

a receiving member pivotally coupling the shaft to the base;

a restraining member coupled to the base and disposed adjacent at least one of the shaft and the receiving member to limit a pivotal motion of the shaft;

a coupling head pivotally coupled to the second end of the shaft, the second end of the shaft having a chamfered edge to maximize a range of motion of the coupling head;

a mounting hardware forming a portion of or installed on the middle portion of the frame at the first side, the mounting hardware including a jack adapter for releasably receiving the coupling head to secure the jack assembly to the motorcycle frame, the jack adapter including the chamfered edge; and a tie down coupled to the base and adapted to be coupled to the bottom portion of the frame at the second side, the tie down including a cam buckle for adjusting a tension therein, the base including an aperture formed therein to receive at least a portion of the tie down therethrough, wherein when the base is spaced from the bottom portion of the frame on the support surface, the coupling head is received by the mounting hardware, and the tie down is coupled to the bottom portion of the frame at the second side, rotation of the power screw cooperates with the tie down to move the motorcycle between the fallen position and the upright position relative to the support surface.

* * * * *